United States Patent
Yokoyama et al.

(10) Patent No.: US 6,815,051 B2
(45) Date of Patent: Nov. 9, 2004

(54) POLYOLEFIN RESIN MOLDING COMPOSITE

(75) Inventors: Masaaki Yokoyama, Yokkaichi (JP); Masahiro Tanaka, Yokkaichi (JP)

(73) Assignee: JSP Corporation, Tokyo (JP)

( * ) Notice: Subject to any disclaimer, the term of this patent is extended or adjusted under 35 U.S.C. 154(b) by 90 days.

(21) Appl. No.: 09/839,716

(22) Filed: Apr. 20, 2001

(65) Prior Publication Data

US 2002/0048673 A1 Apr. 25, 2002

(30) Foreign Application Priority Data

Apr. 21, 2000 (JP) ........................................ 2000-121562

(51) Int. Cl.[7] .................................................. B32B 3/26
(52) U.S. Cl. ................... 428/318.6; 428/314.4; 428/318.8; 428/319.3; 428/319.7; 428/319.9
(58) Field of Search ........................... 428/318.4, 318.6, 428/319.3, 319.7, 319.9, 318.8

(56) References Cited

U.S. PATENT DOCUMENTS 5,476,618 A * 12/1995 Ito et al. .................... 264/45.4
6,027,806 A * 2/2000 Abe et al. ................... 428/407

FOREIGN PATENT DOCUMENTS

| EP | 0928806 A1 | * | 7/1999 |
| JP | 4-344227 | | 11/1992 |
| JP | 10-077359 | | 3/1998 |
| JP | 2000-894 | | 1/2000 |

OTHER PUBLICATIONS

English language Abstract of JP 4–344227.
English language Abstract of JP 10–077359.
English language Abstract of JP 2000–894.

* cited by examiner

*Primary Examiner*—Terrel Morris
*Assistant Examiner*—Hai Vo
(74) *Attorney, Agent, or Firm*—Wenderoth, Lind & Ponack, L.L.P.

(57) ABSTRACT

A foam layer can be formed at a temperature at which the surface quality of a surface layer is not deteriorated, and a molding technique that is excellent in adhesiveness of a foam layer and a surface layer or/and a base member is developed. For the purpose of obtaining a resin molding composite, the present invention is characterized by a polyolefin resin molding composite comprising a surface layer and a foam layer, or a surface layer, a foam layer, and a base member, wherein the foam layer comprises a foam layer produced by fusion bonding thermoplastic expanded resin particles one another by molding, where the thermoplastic expanded resin particles comprises a core that is made of a crystalline thermoplastic resin and is in an expanded state and a polyethylene resin coat covering the core, and the surface layer comprises a thermoplastic synthetic resin having a melting point of 5° C. or more higher than a melting point of polyethylene resin constituting the coat of the particles.

5 Claims, 2 Drawing Sheets

POLYOLEFIN RESIN MOLDING COMPOSITE

BACKGROUND OF THE INVENTION

1. Field of the Invention

The present invention relates to a polyolefin resin molding composite and, more specifically, to a polyolefin resin molding composite using thermoplastic expanded resin particles.

2. Description of the Related Art

With respect to a vehicular interior decoration member, there has hitherto been a member comprising an intervening foam layer between a base member of a solid resin and a surface layer, thereby attaching soft touch to the member to make it luxurious. The process for producing such a vehicular interior decoration member is disclosed in a patent publication (U.S. Pat. No. 2,500,645).

The process for producing a vehicular interior decoration member disclosed in the above patent publication comprises placing a sheet for a surface layer made of polypropylene on one mold, and on the other mold, placing a base member made of a solid resin that is made of polypropylene and contains fillers, filling expanded resin particles made of polypropylene into the space between the sheet for a surface layer and the base member, thereby fusion bonded particles one another to form a foam layer. This process provides such a mold.

However, the hitherto mold producing technique needs high temperature or high pressure steam heating when expanded resin particles are fusion bonded. This leads to a drawback that surface quality of a surface layer is deteriorated by heat when heating. Therefore there is another drawback that when a design as an interior decoration member is formed on the surface of a surface layer, the design becomes difficult to predominate. There is also another problem that if molding is carried out at a low temperature, fusion bonded between expanded resin particles is deteriorated and adhesion of the surface layer and the foam layer and of the foam layer and the base member are also deteriorated.

Furthermore, the above mentioned hitherto molding composite producing technique requires to heat for a long time by a high temperature steam in order to increase adhesiveness between a sheet for a surface layer and expanded resin particles. Because of this condition, when fusion bonded by heating is conducted, much moisture in a gas state infiltrates into spaces between expanded resin particles or particles themselves. If cooling is carried out in this condition, moisture condenses from the gas state to the liquid state, thereby causing great volume shrinkage.

On this account, pressure in the spaces between expanded resin particles or in the particles themselves reduces, thereby causing shrinkage or deformation of an expanded mold made of these particles. This leads to a problem that shape stability becomes worse, that it is hard to obtain a mold fitted exactly in a mold, and that surface appearance of a surface layer is bad. Moreover, in respect of an expanded mold, it is needed that expanded resin particles are sufficiently fusion bonded one another, thereby achieving a high mechanical strength.

The present inventors have investigated wholeheartedly these problems of a hitherto molding composite having a foam layer, thereby developing an excellent molding technique that a foam layer can be molded at such a temperature as not to deteriorate surface quality of a surface layer, and a technique excellent in adhesiveness of a foam layer and a surface layer or/and a base member, and achieving a resin molding composite.

SUMMARY OF THE INVENTION

The present invention is a polyolefin resin molding composite, and is constituted as follows to overcome the above mentioned technical problems. That is, the present invention is characterized by a polyolefin resin molding composite comprising a surface layer and a foam layer, or a surface layer, a foam layer, and a base member, wherein the foam layer comprises a foam layer produced by fusion bonding thermoplastic expanded resin particles one another by molding, where the thermoplastic expanded resin particles comprises a core that is made of a crystalline thermoplastic resin and is in an expanded state and a polyethylene resin coat covering the core, and the surface layer comprises a thermoplastic synthetic resin having a melting point of 5° C. or more higher than a melting point of polyethylene resin constituting the coat of the particles.

The polyolefin resin molding composite of the present invention is consisted of the above mentioned required elements, and is satisfactorily accomplished in the case that the elements are specifically the following elements. One of the specific elements is characterized by that thermoplastic synthetic resin constituting the surface layer is a polyolefin resin. It is also preferable that compressive hardness of the foam layer is 0.05 to 0.7 MPa. Moreover, it is also preferable that void fraction of the foam layer is 1 to 40%.

DESCRIPTION OF THE PREFERRED EMBODIMENT

Figure 1:
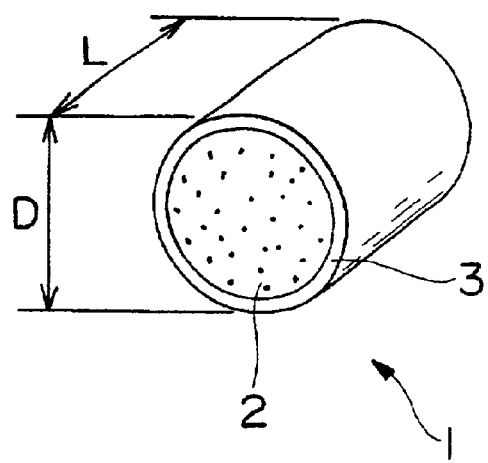
FIG. 1 is a perspective view of the thermoplastic expanded resin particles of the foam layer constituting the polyolefin resin molding composite of the present invention.

The foam layer constituting the polyolefin resin molding composite of the present invention uses expanded resin particles comprising a particular core and a coat covering the core. On that account, without using high temperature and high pressure steam that has hitherto been used as a heating medium when an expanded resin mold is produced, an expanded resin mold can be obtained by heating with comparatively low temperature and low pressure steam or hot air of a dry gas.

The core is usually constituted by a crystalline thermoplastic resin. Examples of such a crystalline thermoplastic resin include, for example, polyethylene resins, polypropylene resins, polybutene resins, polymethylpentene resins, polyester resins, polyamide resins, fluororesins, crystalline styrene resins and the like. Of these, a propylene homopolymer, and random copolymers or block copolymers of propylene with α-olefin except propylene are preferable. On this account, a resin molding composite that is inexpensive, excellent in recyclability, light, and excellent in insulation and cushioning ability can be obtained.

The coat is preferably in the substantially non-expanded state. "The substantially non-expanded state" means a film state that has no bubble structure. The film state may have pores, for example, may be reticulated. Furthermore, the coat contains an ethylene polymer that has a melting point lower than thermoplastic resin of the above mentioned core, or that substantially exhibits no melting point. The melting point of the coat is preferably 15° C. or more lower than the melting point of the thermoplastic resin constituting the above mentioned core. Temperature difference between the melting point of the coat and that of the thermoplastic resin is preferably 20 to 60° C., more preferably 20 to 40° C.

"Substantially exhibit no melting point" means that when measurement of a melting point by a differential scanning calorimeter is carried out, no crystalline melting point is exhibited because of noncrystalline resin. However, such a resin can be used as a coat since the resin itself is fusion bonded at a comparatively low temperature. In the case of such a thermoplastic resin, the temporary melting point is set at 100° C. and melting point difference between this resin and the crystalline thermoplastic resin constituting the core is calculated (so is the melting point difference between this resin and a surface layer mentioned below).

Examples of such a low melting point ethylene polymer include low density polyethylene, linear low density polyethylene, linear ultra-low density polyethylene as well as copolymers of ethylene with vinyl acetate, unsaturated carboxylic acid esters, unsaturated carboxylic acids, vinyl alcohol and the like.

Examples of an ethylene polymer that substantially exhibits no melting point include, for example, rubbers and elastomers such as ethylene/propylene rubber, ethylene/propylene/diene rubber, ethylene/acrylic rubber, chlorinated polyethylene rubber, and chlorosulfonated polyethylene rubber.

These ethylene polymers maybe used singly or as a composition of two or more kinds of the polymers.

Of the ethylene polymers constituting the above coat, low density polyethylene, linear low density polyethylene, and linear ultra-low density polyethylene are preferable. Of these, linear low density polyethylene and linear ultra-low density polyethylene that are polymerized using metallocene catalyst are most preferable.

The above ethylene polymers constituting the coat has preferably substantially no melting point or, if any, a melting point of 125° C. or lower. The reason is because the heating temperature when expanded resin particles are molded is set at a lower temperature. Furthermore, concerning the coat, an ethylene polymer having a melting point of 15° C. or more lower than that of the thermoplastic resin constituting the core may be preferably selected and used.

If the above melting point difference is smaller than 15° C., under the condition that the thermoplastic resin of the core is expanded, the coat made of the ethylene polymer is also likely to be expanded.

The above coat is preferably a mixture of the above ethylene polymer and crystalline thermoplastic resin that is the same kind as the core. This leads to improvement of adhesiveness between the coat and the core.

The blending content of the thermoplastic resin in the coat is preferably selected from the range from 1 to 100 parts by weight for 100 parts by weight of the ethylene polymer. If the blending content of the thermoplastic resin is smaller than 1 part by weight, effect of improvement of adhesiveness between the core and the coat is likely to be worsened. If the blending content exceeds 100 parts by weight, since the sea and island conformation of the coat changes, thermoplastic resin constitutes a continuous sea phase. On this account, the heating temperature when molding cannot be lowered very much.

Moreover, the blending content of thermoplastic resin is preferably from 1 to 50 parts by weight for 100 parts by weight of the ethylene polymer. This improves adhesiveness between the core and the coat, and the heating temperature when molding can be lowered.

In expanded resin particles, thickness of the coat is preferably from 1 to 150 μm. If thickness of the coat is smaller than 1 μm, effect of reduction of the heating temperature when heating is weak. On the other hand, if thickness of the coat exceeds 150 μm, although the heating temperature can be lowered when molding, the proportion of the substantially non-expanded portion in the coat becomes greater, and mechanical strength of a mold is likely to be lowered for the expanded magnification.

Furthermore, thickness of the coat is preferably from 10 to 100 μm. On this account, the heating temperature can be reduced when molding, and mechanical strength of the resin molding composite can also be improved.

An expanded resin particle 1 constituting the foam layer of the polyolefin resin molding composite of the present invention is shown in FIG. 1. As shown in FIG. 1, L/D ratio, which is a ratio of a long diameter L and a short diameter D of expanded resin particle 1, is about from 0.5 to 3. If the ratio is smaller than 0.5, surface area of the coat 3 is diminished, thereby leading to a poor fusion bonded. If L/D ratio exceeds 3, since particle shape is long and narrow, filling efficiency is deteriorated, thereby leading to a poor molding and lowering of shape stability.

In the case of comparatively greater L/D ratio of 1.5 to 3, it becomes easy to obtain a mold having many spaces. Concerning molding performance, L/D ratio is preferably from 0.8 to 2. The average of the short diameter D of expanded resin particles 1, that is, average particle diameter is 1 to 6 mm, and preferably 1.5 to 4.0 mm.

Expanded resin particles 1 can be obtained by, for example, after impregnating composite particles, as shown in FIG. 1, which comprises a core 2 made of a crystalline thermoplastic resin and a coat 3 containing an ethylene polymer that has a lower melting point than the thermoplastic resin or that exhibits substantially melting point, with a volatile expanding agent, heating to beno expanded.

Examples of the above expanding agent include lower aliphatic hydrocarbons such as propane, butane, pentane, heptane, cyclopentane and cyclohexane, halogenated hydrocarbons such as dichlorodifluoromethane and trichloromonofluoromethane, and inorganic gases such as nitrogen, air and carbon dioxide. These are used singly or combined with two or more kinds of the agents.

Expanded resin particles are molded by steam or hot air. In the case of hot air, hot air can be obtained by heating air using heating means such as an electric heater and a steam heater. If hot air is supplied using a blower or compressed air, expanded resin particles can be efficiently heated. Furthermore, loss of thermal energy can be reduced by using a method of recycling and circulating hot air.

When using hot air, a dry gas having vapor pressure of 50 KPa or lower is preferably used. On this account, moisture condenses are not in the spaces between expanded resin particles or particles themselves when molding, thereby retaining shape stability of a resin molding composite.

Molding is carried out at a heating temperature of expanded resin particles lower than a melting point of a crystalline thermoplastic resin of a core. A temperature 5° C. or more lower than the melting point of the above resin is preferable. A temperature 10° C. or more lower than the melting point of the above resin is more preferable. Molding is conducted at a heating temperature higher than a melting point of a coat.

When molding expanded resin particles, the compression state of expanded resin particles is appropriately set according to the physical properties required for a mold. If compression is reduced, a mold having spaces, in which a contact area of expanded resin particles themselves is small, can be obtained. In the present invention, void fraction of a foam layer is preferably from 1% to 40%. Either heating or compression may be carried out earlier. Compression may be carried out during heating.

Molding of expanded resin particles is preferably carried out in the condition that bulk volume of the expanded resin particles is compressed 50 to 99% to make apparent density higher. If the compression rate is smaller than 50%, since a resin molding composite having almost no spaces is obtained, the density of a resin molding composite becomes too large. If the compression rate is larger than 99%, since the contact area of expanded resin particles themselves becomes smaller, a resin molding composite of which adhesion strength is weak is obtained.

Compressive hardness of a foam layer is preferably from 0.05 to 0.7 MPa (measured based on JIS K6767), and more preferably from 0.07 to 0.6 MPa.

If the compressive hardness exceeds 0.7 MPa, expanded resin particles of the foam layer is hard, and a trace of particles is likely to be occurred on a surface layer, thereby spoiling surface appearance and causing a poor cushioning performance. If it is smaller than 0.05 MPa, expanded resin particles of the foam layer is soft, and wrinkle is likely to be occurred in a surface layer, thereby spoiling surface appearance and decreasing strength as an expanded resin molding composite.

Expanded resin particles comprises a core that is a closed wall cell foam made of a crystalline thermoplastic resin, and a coat that contains an ethylene polymer and is substantially a film shape. On that account, expanded resin particles can be heated to a temperature required for fusion bonded of the coat with suppressing softening of the core that has a higher melting point than the coat by passing steam or hot air that has a comparatively low heat capacity through the spaces between expanded resin particles filled in a mold. Thereafter, a resin molding composite can be obtained by fusion bonding expanded resin particles using effectively a compression repulsion that the core has.

The above mentioned expanded resin particles has a composite structure that is constituted by a core that is in an expanded state and a polyethylene resin coat covering the core that is in a substantially non-expanded state. The core in an expanded state, for example, has a closed cell structure or an open cell structure, and a closed cell structure is preferable. The reason is because a closed cell structure has a high compression repulsion of the core when molding, and compressive strength is high even at a low density. Closed cell rate of the core is preferably 50% or higher, and more preferably 70% or higher. This makes a compression repulsion of the core when molding further higher, and a resin molding composite of which compressive strength is high even at a low density can be obtained.

With respect to expanded resin particles for use in the present invention, when the particles are filled in a mold and fusion bonded using hot air of a comparatively low temperature and low pressure steam or a dry gas, infiltration of steam into the spaces between expanded resin particles or particles themselves when molding is reduced, compared with the case using a high temperature and high pressure steam. Therefore volume shrinkage of a mold accompanying with volume shrinkage by condensation of steam is reduced. On this account, this resin molding composite is excellent in shape stability. High temperature aging process in order to recover dimension and shrinkage deformation is not necessary or is sufficient for a short period of time.

Furthermore, in the case of molding by a comparatively low temperature and low pressure steam or a dry gas, a heavy mold tool that has a structure enough to resist a high steam pressure used for molding of hitherto expanded resin particles is not necessary, and consumption of thermal energy is small. If a surface layer made of a thermoplastic resin and expanded resin particles are molded together in a mold, poor fusion bonded affected by moisture of steam is decreased, thereby fusion bonding strongly the surface layer of a thermoplastic resin and the coat of expanded resin particles. Accordingly, the resin molding composite of the present invention has a high strength of fusion bonded, and is excellent in mechanical strength.

A surface layer and a base member, which are fusion bonded and integrated in a laminated shape with a foam layer made of these expanded resin particles, are placed in advance in a mold for molding expanded resin particles and laminated, or are laminated by fusion bonded and the like after expanded resin particles are molded to be a given shape.

For the surface layer, a thermoplastic synthetic resin having a melting point 5° C. or more higher than a melting point of a polyethylene resin constituting the coat of the particles (in the case that the polymer substantially exhibits no melting point, considered as mentioned above) is used in order to maintain surface characteristics with retaining heat melt-adhesiveness of expanded resin particles (the coat of expanded resin particles).

As specific examples of the resin constituting the surface layer, polyolefin resins such as polyethylene resins, polypropylene resins and polyolefin elastomers are preferably used. These polyolefin resins may be used singly or as a composition of two or more kinds of the resins. Concerning the surface layer, it is important that the surface layer comprises a thermoplastic resin having a melting point 5° C. or more, preferably 10° C. or more higher than a melting point of the coat of expanded resin particles.

A multi-layered surface layer as well as a single layer is also used. A film shape mold, a sheet shape mold and a mold that is previously molded to some extent by vacuum molding, compression molding, slush molding or injection molding are used, and the thickness thereof is from 0.3 to 5 mm.

An example of production of the composite of the present invention is a cast molding. Specifically, a method that is generally used is as follows. A surface layer is placed in a mold that can be heated by hot air or steam, and if necessary, on the other side, a base member made of a comparatively hard synthetic resin plate. On the back side of the surface layer (between the surface layer and the base member), expanded resin particles are filled and heated by hot air or steam, thereby fusion bonding the expanded resin particles themselves, and expanded resin particles and the surface layer (and the base member) to be integrated. In this process, the condition that an uneven pattern such as a grain pattern and the like of the surface layer is not disappeared or blurred, or luster of the surface layer is deteriorated even if heating is carried out at a temperature at which expanded resin particles themselves are fusion bonded is the above mentioned melting point difference.

Figure 2:
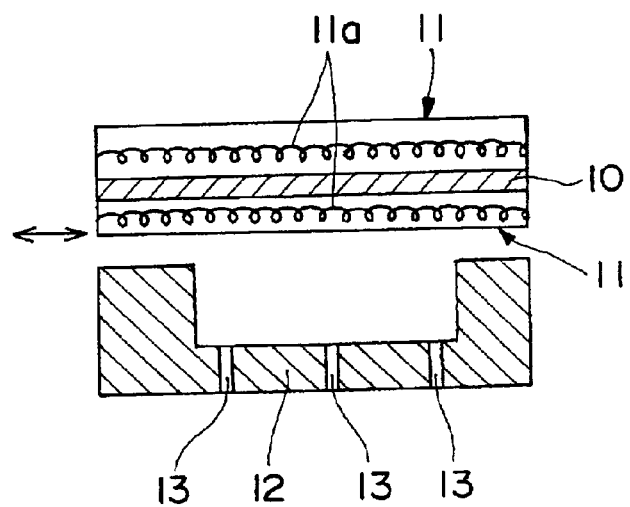
FIG. 2 is a schematic sectional view of the middle of the process for forming the polyolefin resin molding composite of the present invention.
Figure 3:
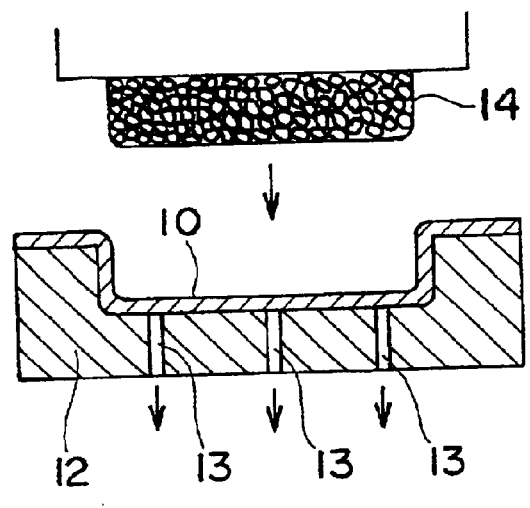
FIG. 3 is a schematic sectional view of the process following the forming process of the resin molding composite shown in FIG. 2.

In respect of molding methods, as shown in FIGS. 2 and 3, a method that a surface layer is vacuum molded and a foam layer that was previously molded before the surface layer is solidified is pressed and fusion bonded to be integrated, or a method that a surface layer is press-adhered on a foam layer is considered. In this case, if a grain pattern is formed on a mold tool for vacuum molding, pattern making on a surface layer can be conducted.

As a base member made on the other side of a surface layer, a comparatively hard polyolefin resins are generally used. This base member is generally used for shape keeping or as a fixation keeping portion against other things such as a car body and the like. Since this base member is not exposed outside, it is not necessary to care about surface patterns and the like of the base member.

Concerning materials of the base member, considering its adhesiveness with a foam, polyolefin resins are preferably used.

If a foam, a surface layer and a base member are all constituted by polyolefin resins, it is preferable because regeneration can be easily conducted when retrieved things are crushed and recycled.

A general molding method is as follows. After expanded resin particles are filled in a mold in which a surface layer and a base member is respectively placed, heating is carried out by passing heated steam or hot air through the spaces between the expanded resin particles filled in the mold, thereby fusion bonding expanded resin particles. Subsequently cooling is conducted to be form a molding composite. Molding composites can also be formed as shown in FIGS. 2 and 3.

That is, as shown in FIG. 2, two heating platens 11 containing a heater 11a on the upper and lower sides of a surface layer 10 are moved to be positioned, and both sides of the interposing surface layer are heated. After surfaces of the surface layer 10 are heated to a given temperature, heating platens 11 are moved back to the former positions, and the surface layer 10 is placed on a mold for vacuum molding. Subsequently the mold is evacuated via many holes 13 opening in the mold, thereby adhering the surface layer 10 to the mold 12.

Subsequently, as shown in FIG. 3, on a given position of the surface layer 10 placed, one side of a foam layer 14 made of expanded resin particles previously formed as explained above is pressed while a surface of the surface layer 10 is in a soft and high temperature condition. A base member is previously placed on the other side of this foam layer 14. Subsequently, another mold is covered to form a molding composite. Like this, an end molded product can be formed by placing the previously formed foam layer 14 in the mold on which the surface layer is placed.

Figure 4:
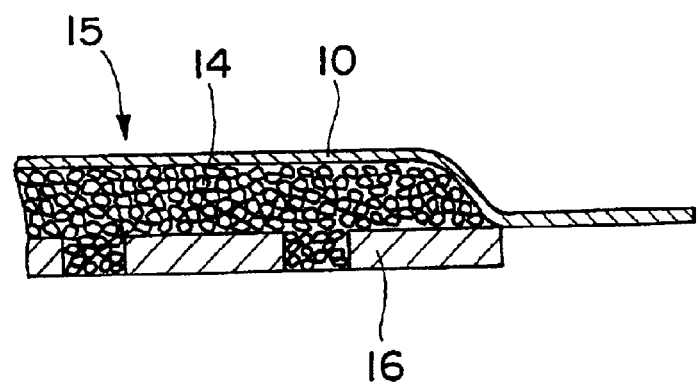
FIG. 4 is a partial sectional view of an embodiment in which the polyolefin resin molding composite of the present invention is applied to a dashboard of a car.

FIG. 4 is a partially sectional view showing a portion of a mold in section in the case that the polyolefin resin molding composite of the present invention is applied to molding of a car dashboard. This dashboard 15 comprises a surface layer 10, a foam layer 14, and a base member 16 as shown in FIG. 4.

The surface layer 10 is formed by a sheet made of a polypropylene resin, and a mat pattern is formed on the surface there of. This surface layer 10 can be formed by polyethylene resins, polypropylene resins, or a styrene-butylene-styrene block copolymer (SEBS). The base member 16 comprises a solid resin containing fillers and made of polypropylene. The foam layer 14 that is filled between the base member 16 and the surface layer 10 is formed using the above mentioned thermoplastic expanded resin particles.

Thus, when the polyolefin resin molding composite of the present invention is formed as, for example, a dashboard of a car and the like, even if a mat pattern and such is formed on the surface of the surface layer 10, since the melting point of the coat of expanded resin particles constituting the foam layer is 5° C. or more lower than that of the surface layer, accordingly the pattern of the surface layer is not damaged when producing a resin molding composite even if heating is carried out to a temperature at which expanded resin particles themselves are fusion bonded.

Since surface appearance of a surface layer becomes good, cushioning performance becomes also excellent, and a given strength as a resin molding composite can be obtained by setting compressive hardness of a foam layer to 0.05 to 0.7 MPa, the polyolefin resin molding composite of the present invention is particularly preferable for the application to a vehicle dashboard and the like.

EXAMPLES

The polyolefin resin molding composite in the present invention is illustrated in further detail by examples, the present invention is not limited to the following examples as long as it is beyond the object.

Example 1

Using a single screw extruder having an inner diameter of 40 mm, an ethylene/propylene random copolymer (melting point 153° C.) of which the ethylene content is 1.5% by weight was kneaded, and using a single screw extruder having an inner diameter of 26 mm, a linear low density polyethylene (melting point 100° C.) that is polymerized with a metallocene catalyst having a density of 0.907 was kneaded. Subsequently, ethylene/propylene random copolymer was used for a core and linear low density polyethylene was used for a coat, and a strand was extruded from a die having a die orifice of a diameter of 1.5 mm.

After cooling this strand by passing through a water tank, the strand was cut so as to be 1.2 mg. The cross section of this composite particle was observed with a phase contrast microscope, and it was found that linear low density polyethylene of thickness of 30 $\mu$m covered ethylene/propylene random copolymer.

Next, in a closed vessel, 100 parts by weight of the above mentioned composite particles, 250 parts by weight of water, 1.0 part by weight of calcium tertiary phosphate having particle diameters of 0.3 to 0.5 $\mu$m, and 0.007 parts by weight of sodium dodecylbenzenesulfonate was placed. Subsequently, 20 parts by weight of butane was supplied into the closed vessel with stirring. After the contents were filled up 62% volume of the vessel, temperature was elevated for an hour until a temperature of 145° C. was reached and the temperature was maintained for 30 minutes.

Subsequently, the releasing valve in the bottom of the closed vessel was opened, and at the same time nitrogen gas was introduced from outside into a gas phase inside the closed vessel, thereby maintaining the pressure in the vessel and releasing the contents under atmospheric pressure to obtain expanded resin particles. Thus obtained expanded resin particles had an average bulk density of 17 Kg/m$^3$ and an average cell diameter of 230 $\mu$m, and there was no blocking of the expanded resin particles themselves.

The cross section of this expanded resin particle was observed with a phase contrast microscope, and it was found that ethylene/propylene random copolymer of the core was in a closed cell expanded state, and on the other hand, linear low density polyethylene was in a substantially non-expanded film state and covered the expanded state core of ethylene/propylene random copolymer. L/D, a ratio of a long diameter L and a short diameter D of an expanded resin particle was 0.9.

These expanded resin particles was fully dried in a drying room at 40° C. After these expanded resin particles were filled in a mold with core vents, or drill holes in which a surface layer (material: a polypropylene resin sheet, thickness: 0.8 mm, melting point: 153° C.) and a base member (material: a polypropylene resin, thickness: 4 mm, melting point: 164° C.) were respectively placed, surface temperature of expanded resin particles was heated to 120° C. by passing hot air through the spaces between expanded resin particles filled in the mold. Subsequently, in the condition that the volume in the mold was diminished to 60%, expanded resin particles were fusion bonded. After that, the product was cooled by air, and a molding composite was taken out from inside the mold.

The density of the foam layer was 28 Kg/m³, the size of the mold was 200 mm in length, 300 mm in width, and 40 mm in thickness. There was no water content. The shape was just the same as the mold without shrinkage and deformation.

Examples 2 to 6,

Comparative Examples 1 and 2

With respect to Examples 2 to 6 and Comparative Examples 1 and 2, as shown in Table 1, expanded molds were produced with changing the resin and state of the core, the resin and state of the coat, average bulk density, L/D ratio, the resin and state of the surface layer, molding temperature, and compression ratio. Except this, production was carried out in the same manner as in Example 1.

TABLE 1

|  | Example 1 | Example 2 | Example 3 | Example 4 | Example 5 | Example 6 | Comparative Example 1 | Comparative Example 2 |
| --- | --- | --- | --- | --- | --- | --- | --- | --- |
| The resin of the core | ET-PR | ET-PR | ET-PR | ET-PR | ET-PR | ET-PR | ET-PR | ET-PR |
| Melting point (° C.) | 153 | 153 | 141 | 141 | 153 | 153 | 153 | 153 |
| The resin of the coat | M-LLDPE | M-LLDPE | LLDPE | LLDPE | M-LLDPE | LLDPE | ET-PR | — |
| Melting point (° C.) | 100 | 100 | 123 | 123 | 100 | 123 | 142 | |
| Average bulk density (Kg/m³) | 17 | 18 | 17 | 18 | 17 | 18 | 18 | 18 |
| L/D ratio | 0.9 | 2.0 | 1.2 | 1.5 | 0.9 | 1.4 | 1.3 | 1.1 |
| The state of the core | Expanded | Expanded | Expanded | Expanded | Expanded | Expanded | Expanded | Expanded |
| The state of the coat | Substantially non-expanded | Substantially non-expanded | Substantially non-expanded | Substantially non-expanded | Substantially non-expanded | Substantially non-expanded | Expanded | — |
| The resin of the surface layer | ET-PR | ET-PR | HDPE | HDPE | HDPE | HDPE | ET-PR | HDPE |
| Melting point (° C.) | 153 | 153 | 131 | 135 | 131 | 135 | 153 | 135 |
| Heat molding temperature (° C.) | 120 | 125 | 125 | 128 | 115 | 128 | 130 | 125 |
| Compression ratio (%) | 40 | 10 | 30 | 3 | 40 | 10 | 30 | 30 |
| The foam layer Bulk density (Kg/m³) | 28 | 20 | 24 | 18.5 | 28 | 20 | Not fusion bonded | Not fusion bonded |
| Void fraction | 1< | 30 | 10 | 35 | 1< | 30 | Measurement impossible | Measurement impossible |
| Fusion bonded test | ○ | ○ | ○ | ○ | ○ | ○ | X | X |

ET-PR: ethylene-propylene random copolymer
M-LLDPE: linear low density polyethylene polymerized with a metallocene catalyst
LLDPE: linear low density polyethylene
HDPE: high density polyethylene
○: The foam layer is adhered and integrated with the surface layer, and there is no appearance abnormality such as shrinkage and deformation.
X: The form layer is separated from the surface layer, or there is deformation, shrinkage or the like in the surface layer.

The physical properties in the above Examples 1 to 6 and Comparative Examples 1 and 2 were measured by the following methods.

Melting Point

Melting point was measured by a differential scanning calorimeter (DSC). First, 3 to 5 mg of a resin was heated until a temperature at which the crystal is melted was reached, then the resin was cooled down to room temperature at a rate of 10° C. per minute. Next, the resin was heated at a rate of 10° C. per minute, and thereby determining a melting temperature as a peak temperature of the endothermic curve thus obtained.

Bulk Density of the Foam Layer

A foam layer was cut out of the end mold, and the weight per unit volume ($Kg/m^3$) was measured.

Compression Ratio of the Foam Layer $$(\text{bulk density of the foam layer} - \text{bulk density of expanded resin particles})/(\text{bulk density of the foam layer}) \times 100(\%) \quad \text{formula (1)}$$

Void Fraction

In a graduated cylinder having an inner diameter of 150 mm and a volume of 5 liter, 3 liter of water was placed, and a testing block of the foam layer having a dimension of 100×100×30 mm (volume 0.3 liter) was submerged. Then the volume V (liter) shown by water level was measured, and void fraction was calculated by formula (2).

$$\{1-(V-3)/0.3\} \times 100\% \quad \text{formula (2)}$$

Fusion of the Surface Layer

The molding composite taken out of inside the mold was allowed to stand at a temperature of 20° C., the appearance after 30 minutes was visually evaluated.

Although the above mentioned embodiment of the present invention is explained by an example of a dashboard of a car and such, the present invention is not limited to such a use, and can be naturally applied to interior decoration members requiring cushioning performance, heat insulating performance, or sound insulating performance, such as a heat insulating panel, or furniture such as a chair and a desk.

As explained above, according to the polyolefin resin molding composite of the present invention, a foam layer can be formed at a temperature at which the surface quality of a surface layer is not deteriorated, and a resin molding composite that is excellent in adhesiveness of a foam layer and a surface layer or/and a base member can be obtained.

Moreover, according to the polyolefin resin molding composite of the present invention, since the melting point of a coat in thermoplastic resin expanded particles is set to a lower temperature than the melting point of a surface layer, appearance of the surface layer is not damaged. Furthermore, since there are spaces in a foam layer, the polyolefin resin molding composite has a sound absorbing effect. The thickness of a molding composite can be further thinned since average particle diameter of expanded resin particles is small. Thus, excellent effects are achieved according to the present invention.

What is claimed is:

1. A polyolefin resin molding composite comprising a surface layer, a foam layer, and a base member, the foam layer being produced by fusion bonding thermoplastic expanded resin particles to one another by molding, the thermoplastic expanded resin particles comprising a core that is made of a crystalline thermoplastic resin and is in an expanded state, and a polyethylene resin coat covering the core that is in a substantially non-expanded state, wherein the foam layer has a compressive hardness of from 0.05 to 0.7 MPa;

the surface layer comprising a thermoplastic synthetic resin having a melting point of 5°C. or more higher than a melting point of the polyethylene resin constituting the coat of the particles;

wherein the surface layer is fusion bonded directly to the foam layer; and wherein the base member is fusion bonded directly to the foam layer.

2. The polyolefin resin molding composite according to claim 1, wherein the polyethylene resin coat comprises an ethylene polymer having a melting point lower than the crystalline thermoplastic resin constituting the core, or an ethylene polymer that substantially exhibits no melting point.

3. The polyolefin resin molding composite according to claim 2, wherein a void fraction of the foam layer is 1 to 40%.

4. The polyolefin resin molding composite according to claim 2, wherein the thermoplastic synthetic resin constituting the surface layer is a polyolefin resin.

5. The polyolefin resin molding composite according to claim 1, wherein the surface layer is fusibly bonded to the coat of the expanded resin particles which constitute the foam layer.

* * * * *